3,037,872
NEW MOISTURE SETTING INKS
Arleen S. Varron, Briarwood, N.Y., assignor to Interchemical Corporation, New York, N.Y., a corporation of Ohio
No Drawing. Filed July 24, 1959, Ser. No. 829,214
3 Claims. (Cl. 106—30)

The invention relates to moisture setting inks. More particularly, it relates to a new moisture setting ink containing a limed or zincated rosin binder which ink is less expensive to produce than conventional moisture setting inks.

Moisture setting printing inks or inks which may be set or dried by the application of water or steam upon the freshly printed film, have been widely known and used for a number of years. Such inks and methods of printing therewith are disclosed in Gessler et al. Patent No. 2,157,385, dated May 9, 1939 Such inks contain a water-soluble solvent, usually a glycol, polyglycol or a monoalkyl ether of a glycol or polyglycol. When water is sprayed upon or otherwise added to a printed fim of an ink of this character, it causes the ink binder to be precipitated so that upon evaporation or removal of the solvent and water such as by penetration into the paper, the ink is substantially dry.

Because moisture setting printing and inks are relatively high in cost, less expensive moisture setting inks have been much sought after in the past. While limed and zincated rosins were known to be among the least expensive ink binders and were in use in conventional intaglio and heat setting inks, these rosins were never considered as binders for moisture setting ink because they were considered to be insoluble in the conventional moisture setting ink solvents.

The accepted insolubility of limed rosin in glycols made it all the more surprising to find that limed rosin is soluble in dipropylene glycol. Accordingly, there has now been discovered a novel moisture setting ink varnish which comprises a solution of limed or zincated rosin in dipropylene glycol which when pigmented with a suitable pigment provides an excellent moisture setting ink. As will be hereinafter described in greater detail, in accordance with the practice of this invention, there may be produced both moisture setting inks having the stability of conventional moisture setting inks, in that they are water-tolerant up to 80% relative humidity at 75° F. and have conventional drying speeds in the order of 300 to 400 feet per minute and moisture setting inks which are water tolerant only up to 55% relative humidity and consequently have been found to dry at high speeds in the order of 1000 feet per minute in a steam drier. While the inks with the conventional drying speeds may be used on conventional typographic presses, the high speed drying inks are so intolerant of water that they are unprintable at relative humidities above 55–60% at 75° F. Accordingly, during the use of these rapidly drying inks, special techniques have to be employed to prevent drying of the ink on the press, as for instance, by maintaining a body of dehumidified air about the distribution system of the press with which the inks are being printed. One method of printing with these unstable inks is disclosed in copending application Serial No. 549,202, filed November 25, 1955 now abandoned. Alternately, the inks can be printed in air conditioned press rooms at controlled humidities not in excess of 55%.

In preparing the varnish, while the proportions of the dipropylene glycol and the rosin are not critical in that there are no substantial limits to the solubility of the rosin of this invention in dipropylene glycol, for the best results, it is recommended that the resin constitute from 20% to 75% of the total vehicle weight. It has been found that the stability of the varnish is directly related to the percentage of lime incorporated into the limed rosin. As the amount of lime increases, the stability of the varnish decreases. This relationship determines whether the ink produced is a conventional drying speed moisture setting ink or a moisture setting ink which has properties required of high speed moisture setting inks. For example, when from 3% to 5% by weight of lime is contained in the limed rosin, the ink is stable at relative humidities of 75–80% at 75° F. That is the binder will not precipitate at lower humidities. When pigmented, this varnish provides a conventional speed drying moisture setting ink. However, when the lime content is raised to from 6% to 8% by weight, the resulting varnish is not stable at relative humidities above 50–60%. This decrease in stability enables inks containing this varnish to dry at speeds of 1000 feet per minute.

With respect to zincated rosin containing varnishes, it has been found that because of their lower stabilities, they are suitable primarily for the high speed drying moisture setting inks.

Any of the pigments used in conventional moisture setting inks may be used as pigments. The pigments described in the following examples are merely given for illustration purposes and it is not intended to limit this invention to the use of the pigments described.

The following examples will illustrate the practice of this invention:

Example 1

A varnish is prepared as follows: 38.75 lbs. of dipropylene glycol is heated to 180° C. over a period of 100 minutes and 77 lbs. of gum rosin is added. The mixture is heated to 204° C. and 1.31 lbs. of calcium hydrated oxide (calcium hydroxide containing 24.3% of combined water) is slowly added. The addition of the calcium hydrated oxide results in a noticeable foaming reaction. When this reaction subsides, .11 lb. of water are added. 1 lb. of calcium hydrated oxide is added and the mixture is maintained at 204° C. for 20 minutes. The mixture is cooled to 182° C. and 32 lbs. of dipropylene glycol are added. The product has a 52% solids content by weight, an acid value of 107 and a viscosity of 90 poises. Moisture setting inks are prepared by dispersing suitable pigments in amounts varying with the specific pigmentation described in said varnish. These pigments which are well known to those skilled in the art include, among others, calcium lithol, molybdate orange, red lake C, light chrome yellow, etc.

When a suitable pigment is dispersed in the above varnish, the resulting ink sets well by moisture setting, air drying or heat drying, the moisture setting being as rapid as that of conventional moisture setting inks. The ink has good body and stability at humidities as high as 80% relative humidity at temperatures of 24° C. There is no burn out in printed matter even after accelerated oven aging at 55° C. for one week.

The ink is then subjected to the following tests:

*Wet rub test.*—Wherein a print made by said ink is allowed to soak for one minute in water. When the print is removed from the water, wet "Kleenex" tissue is placed over the print and a 200 gm. weight is placed on the tissue. The tissue carrying the weight is then drawn across the print and then checked for "rub-off" from the print.

*Ammonia fume test.*—Prints made with the ink of this example are placed in a desiccator containing 28% ammonium hydroxide for 10 seconds and then dipped in water to solubilize the ammonia. A strip of blotter paper is held over the print and then checked for transfer of ink.

The ammonia fume test is a test to determine whether food packages printed upon with this ink will react with ammonia fumes under refrigeration. The wet rub test is a test to determine whether packages printed upon with said ink can withstand exposure to moisture or rain. The ink of this example showed excellent results on the wet rub and the ammonia fume tests.

*Example 2*

The following varnish is prepared. A mixture of 48.8 parts by weight of rosin and 24.4 parts of dipropylene glycol are heated to 180° C., 2.4 parts of calcium hydrated oxide (calcium hydroxide containing 24.3% of combined water) is added slowly under continual stirring. The mixture is then maintained at 180° C., under continual stirring for 20 minutes. The mixture is cooled to 150° C. and 24.4 additional parts of dipropylene glycol are added. Stirring is continued as the mixture is allowed to cool to 100° C. 80 parts of the resulting varnish are pigmented with 20 parts by weight of barium red lake C pigment. The resulting ink displays press stability at 80% relative humidity at room temperature of 76° F. There is no burn out in printed matter even after accelerated oven aging at 55° C. for one week. When subjected to the tests described in Example 1, the printed matter displayed a resistance to ammonia fumes and water equivalent to that of the ink of Example 1.

*Example 3*

A varnish is prepared by adding 50 parts by weight of 5.25% limed wood rosin to 50 parts of dipropylene glycol. 80 parts of the resulting varnish are pigmented with 20 parts by weight of barium red lake C pigment. The resulting ink displays properties substantially equivalent to those of the ink of Example 2.

*Example 4*

The following varnish is prepared: A mixture of 60 parts by weight of rosin and 25 parts by weight of dipropylene glycol are heated to 180° C., 3.6 parts of calcium hydrated oxide (calcium hydroxide containing 24.3% of combined water) is slowly added. The mixture is then maintained at 180° C. under continual stirring for 20 minutes. The mixture is cooled to 150° C. and 30 additional parts of dipropylene glycol are added. Stirring is continued as the mixture is allowed to cool to 100° C. 80 parts of the resulting varnish are then pigmented with 20 parts by weight of barium red lake C pigment. The resulting ink displays press stability of 45–50% relative humidity at a room temperature of 76° F. Printed matter produced with said ink displays resistance to burn out on accelerated oven aging, resistance to water and to ammonia fumes which is equivalent to that of printed matter produced with the ink of Example 1.

*Example 5*

| | Parts by weight |
|---|---|
| (A) Rosin | 60 |
| (B) Dipropylene glycol | 25 |
| (C) Zinc oxide | 1.2 |
| (D) Dipropylene glycol | 10 |

To a mixture of ingredients (A) and (B) maintained at 180° C., (C) is added slowly. The mixture is maintained at 180° C. for 20 minutes under continual stirring and then cooled to 150° C., at which time (D) is added. The mixture is allowed to cool and is continually stirred until it falls below 100° C. 25 parts of barium red lake C pigment are dispersed in resulting varnish to provide an ink.

The resulting ink displays a press stability at 50–55% relative humidity at a room temperature of 76° F. Printed matter produced with said ink displays a resistance to burn out on accelerated oven aging, resistance to water and to ammonia fumes which is equivalent to that of printed matter produced with the ink of Example 1.

*Example 6*

Example 5 is repeated, using the following proportions of ingredients.

| | Parts by weight |
|---|---|
| (A) Rosin | 60 |
| (B) Dipropylene glycol | 20 |
| (C) Zinc oxide | 3 |
| (D) Dipropylene glycol | 13 |

The resulting ink displays a press stability of 55–60% relative humidity at a room temperature of 75° F. In all other respects, this ink is equivalent to the ink of Example 5 in properties.

While there have been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A typographic printing ink characterized by its ability to be set upon the addition of water to a film thereof consisting essentially of pigment dispersed in a dipropylene glycol solution of a binder selected from the group consisting of limed rosin containing from 3% to 8% by weight of lime and zincated rosin containing from 1% to 5% by weight of zinc.

2. The typographic printing ink of claim 1 wherein said binder is zincated rosin containing from 1% to 5% by weight of zinc.

3. The typographic printing ink of claim 1 wherein said binder is limed rosin containing from 3% to 8% by weight of lime.

References Cited in the file of this patent

UNITED STATES PATENTS

| 2,237,973 | Price et al. | Apr. 8, 1941 |
| 2,437,908 | Chiappe | Mar. 16, 1948 |
| 2,439,380 | Carman et al. | Apr. 13, 1948 |
| 2,776,895 | Biser | Jan. 8, 1957 |
| 2,807,553 | Fischer | Sept. 24, 1957 |
| 2,825,657 | Mock et al. | Mar. 4, 1958 |

FOREIGN PATENTS

| 538,104 | Canada | Mar. 12, 1957 |